Jan. 10, 1928.  1,655,780

S. BRININGER ET AL

SPREADER

Filed Oct. 12, 1925  2 Sheets-Sheet 1

Samuel Brininger
Ralph H. Gilbert
Inventors,

By C. A. Snow & Co.
Attorneys.

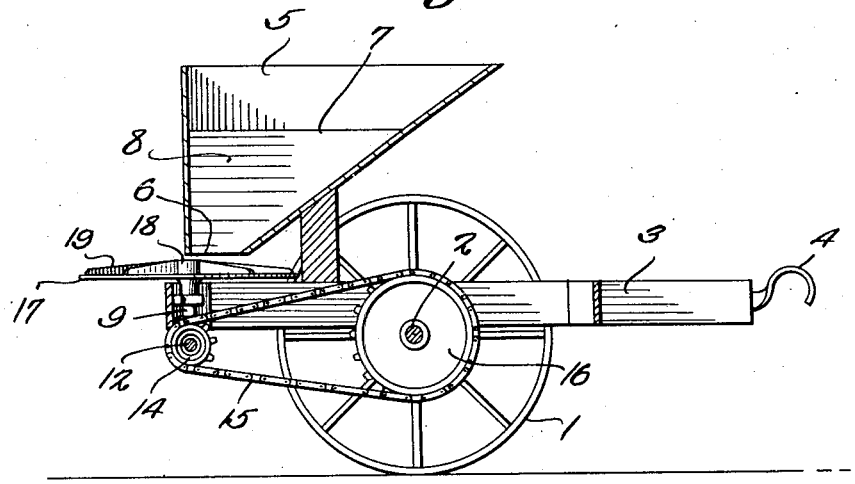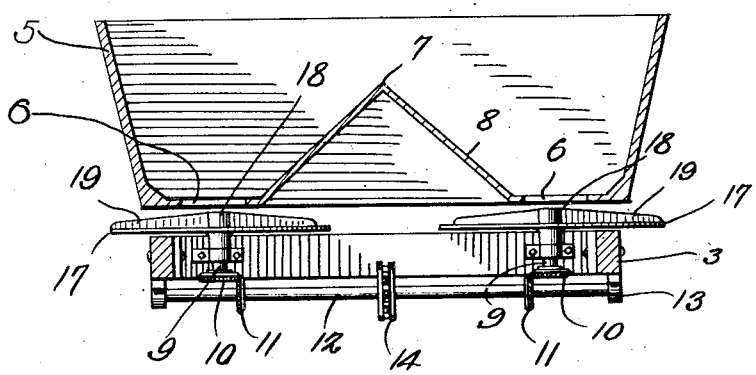

Patented Jan. 10, 1928.

1,655,780

UNITED STATES PATENT OFFICE.

SAMUEL BRININGER AND RALPH H. GILBERT, OF CLYDE, OHIO.

SPREADER.

Application filed October 12, 1925. Serial No. 62,064.

This invention relates to a machine designed primarily for spreading dust and stone chips over the surfaces of roads being dressed or resurfaced, one of the objects of the invention being to provide a machine which is simple and compact in construction and can be connected to and actuated by an ordinary motor truck.

A further object is to provide a machine which, when connected to a truck, will be so located as to receive material directly from the body of the truck as required, means being incorporated in the machine for broadcasting or scattering this material easily over the surface being dressed or finished.

Another object is to provide a spreader which can be quickly applied to and removed from a truck and will operate efficiently whether the truck is moving forwardly or backwardly.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 3 is a vertical longitudinal section through the machine.

Figure 4 is a section on line 4—4 Figure 1.

Figure 1:
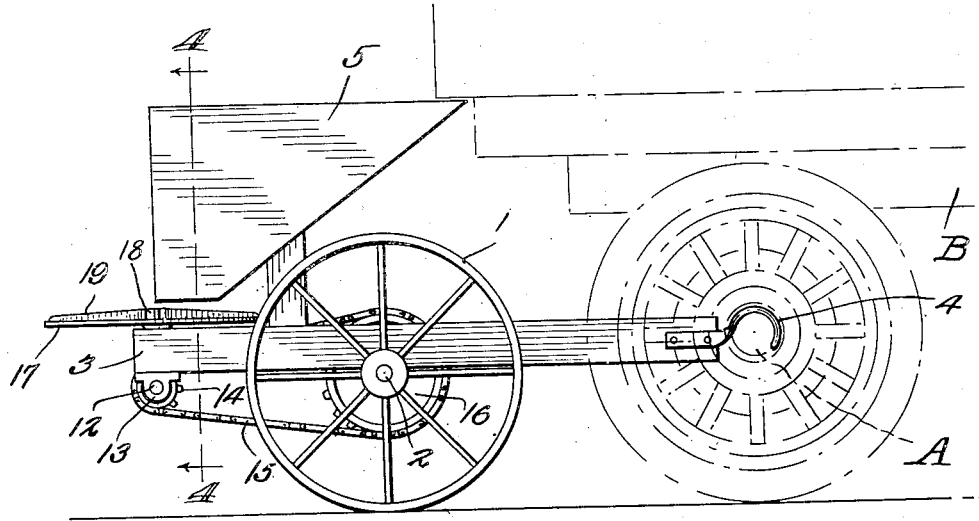
Figure 1 is a side elevation of the machine, the same being shown connected to a truck, the rear portion of this truck being illustrated by broken lines.
Figure 2:
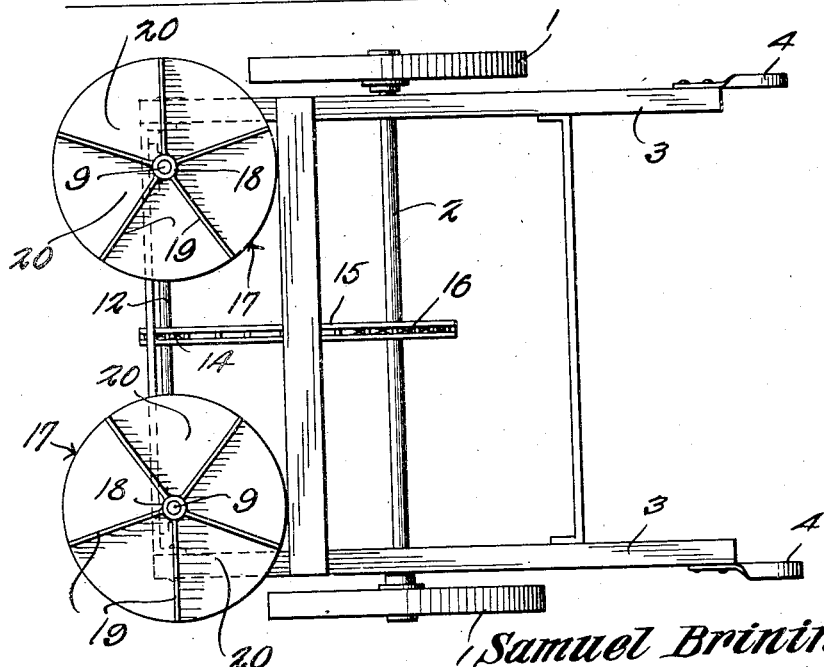
Figure 2 is a plan view of the machine, the hopper being removed.

Referring to the figures by characters of reference 1 designates supporting wheels carrying an axle 2 on which is mounted the frame 3 of the machine. Extending from the sides of this frame at one end are hooked attaching brackets 4 adapted to engage the rear axel A of a motor truck B so that when the truck is moved forwardly or backwardly the wheel supported frame will be carried thereby.

Mounted in any suitable manner upon the frame 3 is a hopper 5 so located that when the frame 3 is attached to the truck, the open top of the hopper will extend, at its forward end, slightly under the rear or delivery end of the truck body. Consequently, by opening the tail gate of the body the material or a portion of the material contained therein will be directed readily into the hopper 5.

In the structure illustrated the hopper is provided with spaced outlets 6 between which is arranged a spreader 7 formed of downwardly diverging bottom portions 8. Thus when material is directed into the hopper it will be spread toward the two openings 6.

Mounted for rotation on the frame 3 below the respective outlet openings 6 are shafts 9 provided, at their lower ends with gears 10. These gears mesh with gears 11 secured to a transverse shaft 12. The said shaft is journaled in the frame 3 or in bearings 13 provided therefor and has a sprocket 14 adapted to receive motion through a chain 15 from a large sprocket 16 secured to and rotatable with the axle 2.

Connected to the upper end of each of the vertical shafts 9 is a spreading disk 17 having a central boss 18 upon its upper face from which radiates fins 19 which extend to the periphery and gradually diminish in height from the center of the disk toward the margin thereof. These fins are regularly spaced so as to provide angular or segmental pockets 20 between them into which material will be dropped from the outlet openings 6.

When the machine is to be used for spreading or broadcasting stone chips over a tarred road the same is attached to the rear axle of a truck containing a load of the material to be spread and the truck is driven slowly backwardly over the tarred surface. Motion will thus be transmitted from the supporting wheels 1 to the shaft 12 with the result that the two disks 17 will be rotated at a high speed. During such rotation the material contained within the hoppers will gravitate onto the disks and will be thrown outwardly therefrom by centrifugal force so as to be broadcast over the surface and cover the tar previously deposited. When a new supply of material is needed within the hopper 5 it is only necessary to deliver the proper amount from the body of the truck into the hopper. By backing the apparatus as described the wheels of the truck and the spreader will not come into contact with the tar but, instead, will ride upon the material scattered over the tar. Where tar is not used the truck can be driven forwardly and the apparatus will operate just as efficiently as though moving rearwardly.

What is claimed is:

A spreading machine for attachment to a vehicle for movement thereby in advance thereof including a frame, means on the frame for detachably engaging the axle of the propelling vehicle, wheels supporting the frame, a hopper mounted on the frame having spaced outlets adjacent the respective sides of the frame, a disk mounted for rotation beneath each outlet, each disk extending laterally across the path of one of the wheels supporting the frame, and means driven by said supporting wheels for rotating the disks simultaneously to spread material in the paths of said wheels during the movement of the spreading machine in front of its propelling vehicle.

In testimony that we claim the foregoing as our own, we have hereto affixed our signatures.

SAMUEL BRININGER.
RALPH H. GILBERT.